United States Patent
Han et al.

(10) Patent No.: US 7,283,436 B2
(45) Date of Patent: Oct. 16, 2007

(54) METHOD AND APPARATUS FOR CONTROLLING LAYER CHANGE OF OPTICAL MEDIA

(75) Inventors: Moon-Soo Han, Seoul (KR); Woo-Min Jeong, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 552 days.

(21) Appl. No.: 10/299,812

(22) Filed: Nov. 20, 2002

(65) Prior Publication Data

US 2003/0123345 A1 Jul. 3, 2003

(30) Foreign Application Priority Data

Dec. 28, 2001 (KR) .............................. 2001-86884

(51) Int. Cl.
  *G11B 7/095* (2006.01)
(52) U.S. Cl. ................................. 369/44.29
(58) Field of Classification Search ............. 369/44.32; G11B 7/00
  See application file for complete search history.

(56) References Cited

U.S. PATENT DOCUMENTS

| | | | | |
|---|---|---|---|---|
| 6,147,942 A | * | 11/2000 | Abe et al. | 369/44.27 |
| 6,584,048 B1 | * | 6/2003 | Tateishi et al. | 369/44.28 |
| 6,744,709 B2 | * | 6/2004 | Kobayashi | 369/44.25 |
| 6,760,289 B1 | * | 7/2004 | Ide | 369/53.2 |
| 2003/0112720 A1 | * | 6/2003 | Chiang | 369/44.29 |
| 2004/0202084 A1 | * | 10/2004 | Manoh et al. | 369/94 |

FOREIGN PATENT DOCUMENTS

KR  2000-41213  7/2000

* cited by examiner

*Primary Examiner*—William Korzuch
*Assistant Examiner*—Joseph Haley
(74) *Attorney, Agent, or Firm*—Staas & Halsey LLP

(57) ABSTRACT

A layer change control method and an apparatus for an optical medium in which a layer change is accurately performed even where there is a level deviation of a focus actuator error signal (FE). The layer change control method includes measuring a needed time from where a focus point of the optical medium breaks away from a current layer to where the focus point arrives at a desired layer, and controlling a focus driving voltage needed to pull the focus point of the optical medium into the desired layer, and a time to output the focus driving voltage by using the needed time. Therefore, since a layer change can always be accurately performed even where there is a deviation in a FE level, according to the physical characteristic and operational deviation of a focus actuator, a stable disc driving environment can be provided.

22 Claims, 6 Drawing Sheets

<Coefficient>
SFok : FE Hysteresis Level
Fklf : Kick end FE Level
Fkll : Brake Start FE Level
Fspk : Kick Force
FkBk : Brake Force <Coefficient>

Fkll : Kick Time Start FE Point
Fklf : Brake Start FE Point
FljLv: Kick End FE Point
SFok : FE Hysteresis Level
Lfpi : Pull_In Level after L-Jump
Fspk : Kick Force
Fbrk : Brake Force
Fktm : Kick Time
Fltm : Inertia Time
Fbrtm: Brake Time
FBTrf : Brake Time Coefficient

METHOD AND APPARATUS FOR CONTROLLING LAYER CHANGE OF OPTICAL MEDIA

CROSS-REFERENCE TO RELATED APPLICATIONS

This application claims the benefit of Korean Patent Application No. 2001-86884 filed Dec. 28, 2001, in the Korean Intellectual Property Office, the disclosure of which is incorporated herein by reference.

BACKGROUND OF THE INVENTION

1. Field of the Invention

The present invention relates to an optical medium having a dual layer, and more particularly, to an apparatus and a method of controlling a layer change of an optical medium having a dual layer.

2. Description of the Related Art

Generally, an optical medium is a disc-type recording and reproducing medium. Optical media that are currently available are roughly divided into digital versatile discs (DVDs) and compact discs (CDs). An optical medium having a dual layer has been introduced to satisfy an increasing demand to store more data into an optical medium. Dual layer optical media that are currently available includes a dual layer DVD.

FIG. 1 shows a flowchart illustrating a conventional method of changing a layer in dual layer optical media. That is, where a dual layer optical medium is placed on an optical driver to be driven, and where a layer change of the optical medium is requested, a kick voltage (kick force) Fspk, as shown in FIG. 2, is added to a focus actuator driving signal (focus of drive, FOD) in operation 101. The kick voltage is a kick force which is needed to have a focus point break away from a current layer. Therefore, the focus point begins to break away from the current layer by the FOD, to which the kick voltage is added.

In operation 102, it is monitored whether a level of a generated focus actuator error signal (FE) arrives at a SFok+Fkll level shown in FIG. 2. At this time, the FOD maintains the state in which the kick voltage Fspk is added to the FOD. SFok is a hysteresis level of the FE, and Fkll is the FE level where a break operation of the focus actuator begins. The break operation is an operation to reduce the kick force provided to the focus actuator to pull in the focus point to a target layer.

Where it is determined in the operation 102 that the FE level arrives at the SFok+Fkll level, the monitoring level for the FE level changes to an Fklf level and the FE level is monitored till the FE level arrives at the Fklf level in operation 103. The Fklf level is an FE level corresponding to the end point of a kick interval.

Where it is determined in the operation 103 that the FE level arrives at the Fklf level shown in FIG. 2, the adding of the kick voltage to the FOD stops in operation 104 so as to stop the kick operation. Accordingly, interval t on the FOD shown in FIG. 2 becomes the kick operation interval of the focus actuator.

Where the kick operation interval ends, an FOD having a reference voltage Vref is generated in operation 105. In operation 106, it is monitored whether the FE level arrives at the Fkll level shown in FIG. 2. An interval from a time where the FOD is generated as the reference voltage Vref, to a time where the FE level arrives at the Fkll level, is an inertia interval in which a kick voltage or a brake voltage is not added.

Where it is determined in the operation 106 that the FE level arrives at the Fkll level, an FOD having a brake voltage FkBk is generated in operation 107. Accordingly, the focus actuator begins to perform an operation to reduce the voltage, which arrived at the kick voltage, so as to pull the focus point into a desired layer.

In operation 108, it is monitored whether the FE level arrives at a (3/2) SFok+Fkll level shown in FIG. 2. Where it is determined that the FE level arrives at the (3/2) SFok+Fkll level, the monitoring pointer for the FE level again changes into the SFok+Fkll level in operation 109. Where it is determined in the operation 109 that the FE level arrives at the SFok+Fkll level, the brake operation is processed to stop in operation 110. That is, adding of the brake voltage to the FOD stops. Accordingly, the brake operation interval becomes T' interval of FIG. 2. Then, the focus actuator performs a focus pulling operation into a corresponding layer in operation 111.

FIG. 3 shows a diagram illustrating a layer change of an optical medium from layer 0 to layer 1. From focus point A, a kick voltage Fspk is added to a FOD for a kick interval (t) so that the focus point of the focus actuator breaks away from the layer 0. Then, during an inertia interval T, only a reference voltage is generated in the FOD. Thereafter, from a focus point B, a brake voltage FkBk is added to the FOD for a brake interval T' so as to pull a focus point C into the layer 1.

However, since predetermined voltage values are used as the kick voltage and the brake voltage which control the layer change, if a deviation occurs in the FE level and the FE waveform, according to the sensitivity of the focus actuator, the location of a pickup, and the type of the optical medium, or if there is a difference between FE levels generated in an inner circumference and an outer circumference of the optical medium, the focus point cannot be accurately detected. Accordingly, a focus drop occurs and the layer change fails.

SUMMARY OF THE INVENTION

Accordingly, it is an object of the present invention to provide an apparatus and a method of controlling a layer change in an optical medium, so as to accurately perform the layer change even where there is a deviation in a focus actuator error signal (FE) waveform and in a level of the FE which is generated due to the physical characteristic of the optical medium, and operation characteristics of a focus actuator and a pickup of the apparatus.

Additional objects and advantages of the invention will be set forth in part in the description which follows and, in part, will be obvious from the description, or may be learned by practice of the invention.

To achieve the above and other objects of the present invention, there is provided a layer change method for an optical medium, the method comprising measuring a needed time from where a focus point of the optical medium breaks away from a current layer to where the focus point arrives at a desired layer, and controlling a focus driving voltage needed to pull the focus point of the optical medium into the desired layer, and an output time to output the focus driving voltage by using the needed time.

The measuring of the needed time may comprise measuring a first needed time of a kick interval in which the focus point breaks away from the current layer, and measuring a second needed time of an inertia interval from where the kick interval ends to where the focus point arrives at the desired layer, separately from the measuring of the first needed time. The controlling of the focus driving voltage and the output time may comprise controlling the output time to output the focus driving voltage according to the first needed time of the kick interval and whether the focus point is pulled into the desired layer, and controlling the focus driving voltage according to the second needed time of the inertia interval and whether the focus point is pulled into the desired layer.

The controlling of the focus driving voltage and the output time may further comprise determining a third time where the focus driving voltage is output according to the first needed time of the kick interval, stopping a control operation where the focus driving voltage is output according to the first needed time of the kick interval and allowing the focus point to pull into the desired layer in response to the focus point being pulled into the desired layer before the third time is over, and using the focus driving voltage, absent a voltage added due to the second needed time of the inertia interval, to reduce a kick force provided during the kick interval, as a driving voltage until the focus point is pulled into the desired layer in response to the focus point not being pulled into the desired layer where the third time is over.

To achieve the above and other objects of the present invention, there is provided another layer change control method for an optical medium, the method comprising measuring a needed time for a break-away interval, in which a focus point of the optical medium breaks away from a current layer, as a first time in response to a layer change request, measuring a needed time for an inertia interval, from where the break-away interval ends to a time immediately before the focus point is pulled into a desired layer, as a second time, determining a focus driving voltage needed during a reduction interval, using the second time, to reduce a break-away force that is provided during the break-away interval to make the focus point pull into the desired layer, determining a time needed in the reduction interval by using the first time and a predetermined time coefficient, as a third time, and controlling the reduction interval by using the focus driving voltage and the third time so as to pull the focus point into the desired layer.

The predetermined time coefficient may be set according to a mechanical deviation which occurs in the reduction interval.

To achieve the above and other objects of the present invention, there is provided yet another layer change control method for an optical medium, the method comprising obtaining an average value of a focus driving voltage which is output for a predetermined time, and in response to a layer change request, providing a voltage obtained by adding the average value and a kick voltage, which is set to make a focus point of the optical medium break away from a current layer, as the focus driving voltage, and measuring a needed time for a kick interval in which the focus point breaks away from the current layer. Additionally, the method further comprises determining a needed time for a brake interval to reduce a force which is provided for the break-away of the focus point, by using the needed time for the kick interval and a predetermined time coefficient, measuring a needed time for an inertia interval between the kick interval and the brake interval, determining a brake force needed in the brake interval by using the needed time for the inertia interval, determining a voltage obtained by using the brake force and the average value as the focus driving voltage to be used in the brake interval, and controlling the brake interval according to the determined needed time and the determined focus driving voltage thereof so as to pull the focus point into a desired layer.

The average value may be updated in each predetermined time unit. The measuring of the needed time for the kick interval, the measuring of the needed time for the inertia interval, and the controlling of the brake interval may be performed based on a result of monitoring a focus error signal of the optical medium.

To achieve the above and other objects of the present invention, there is also provided a layer change control apparatus of an optical medium, comprising a pickup which records data on or reproduce data from the optical medium, a servo control unit which, in response to a layer change request, monitors a focus error signal generated from the pickup, and measures a first needed time for a break-away interval, in which a focus point of the pickup breaks away from a current layer of the optical medium, and a second needed time for an inertia interval, which is between a reduction interval to reduce a break-away force provided in the break-away interval and the break-away interval, and determines a needed time for the reduction interval and a focus driving voltage which is generated in the reduction interval to control the layer change by using the first and second needed times. The apparatus further comprises a motor driving unit which is controlled by the servo control unit to drive the pickup.

The apparatus may further comprise a storage unit which stores a plurality of reduction force information items corresponding to the break-away force, wherein the servo control unit selects one of the plurality of reduction force information items stored in the storage unit, by using the second needed time, and uses the selected one of the reduction force information items to determine the focus driving voltage generated in the reduction interval.

BRIEF DESCRIPTION OF THE DRAWINGS

The above objects and advantages of the present invention will become more apparent by describing in detail preferred embodiments thereof with reference to the accompanying drawings in which.

DETAILED DESCRIPTION OF THE PREFERRED EMBODIMENTS

Figure 1:
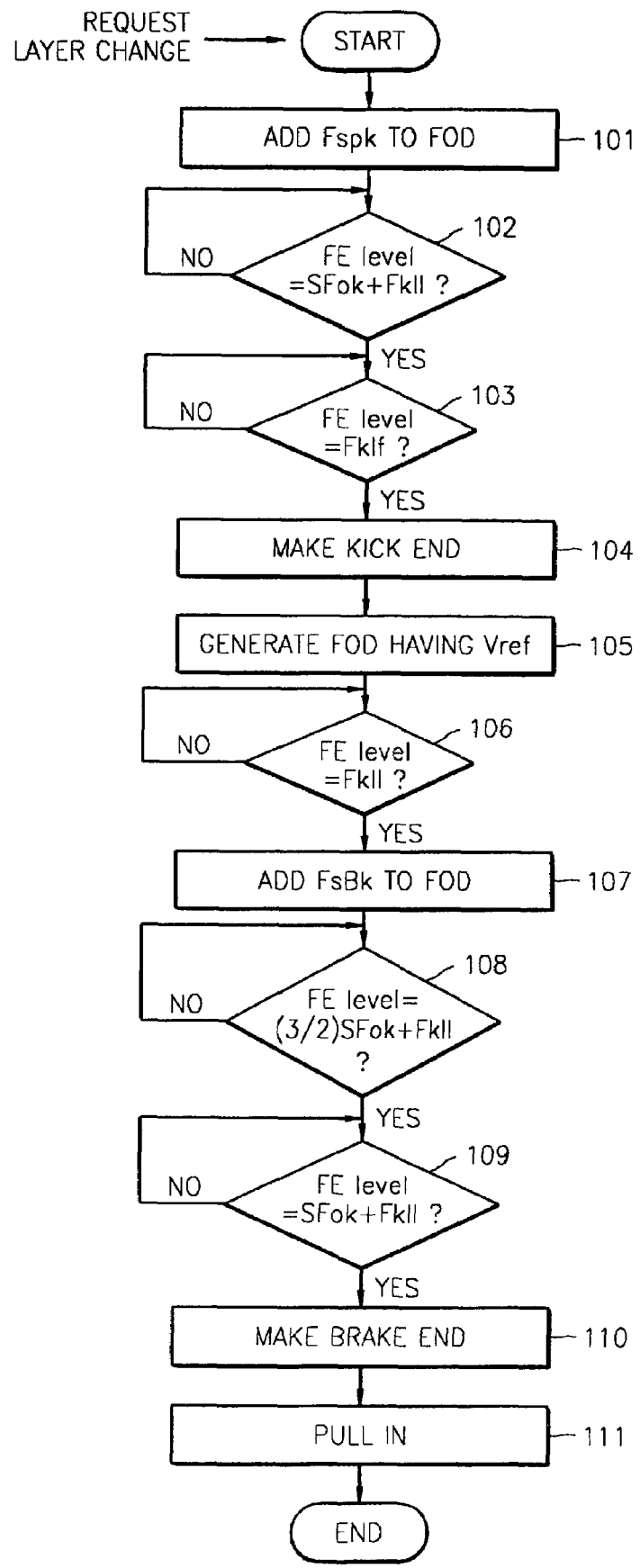
FIG. 1 is a flowchart illustrating a conventional layer change control method for an optical medium.
Figure 2:
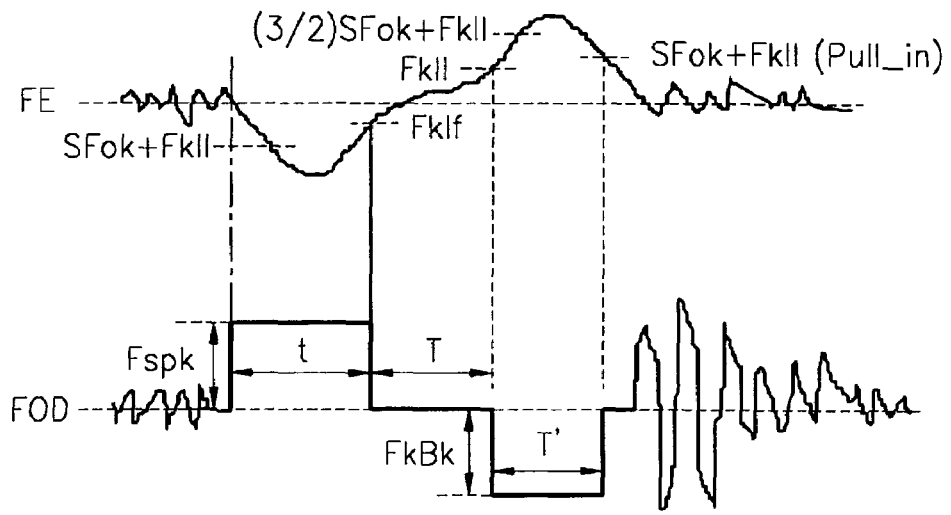
FIG. 2 is a waveform diagram of a focus error signal (FE) and a focus driving voltage (FOD) that are used to control the layer change according to the method of FIG. 1.
Figure 3:
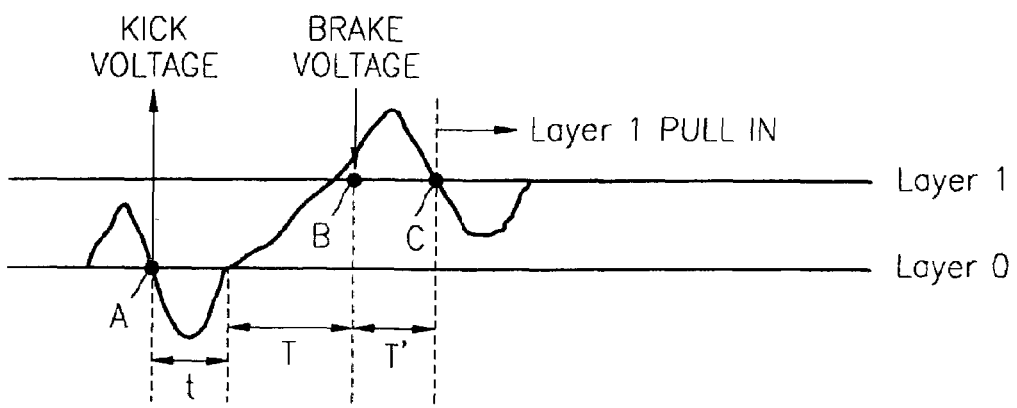
FIG. 3 is a diagram illustrating a conventional layer change of an optical medium.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 4:
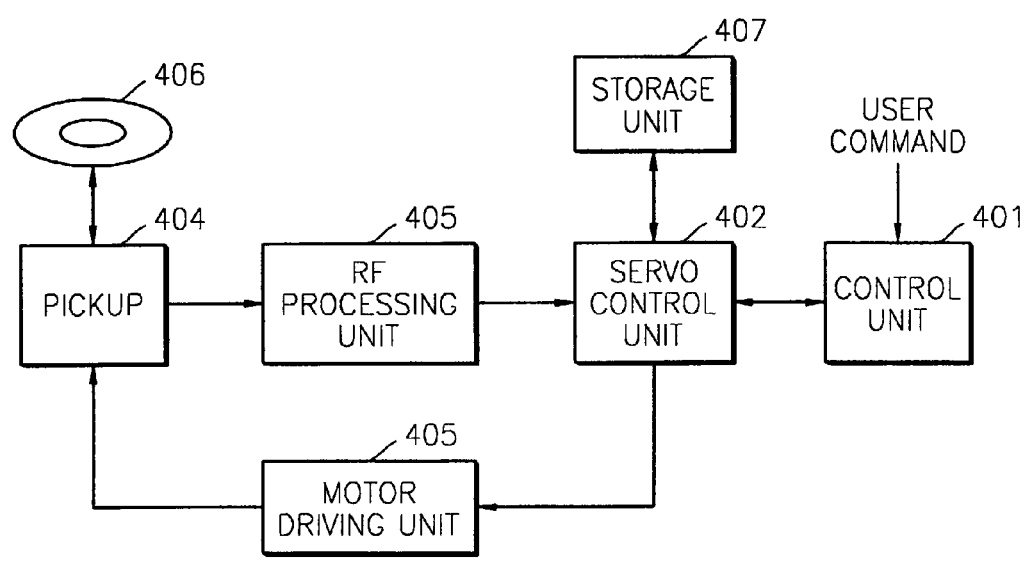
FIG. 4 is a block diagram of a layer change control apparatus for an optical medium according to an embodiment of the present invention.
Figure 6:
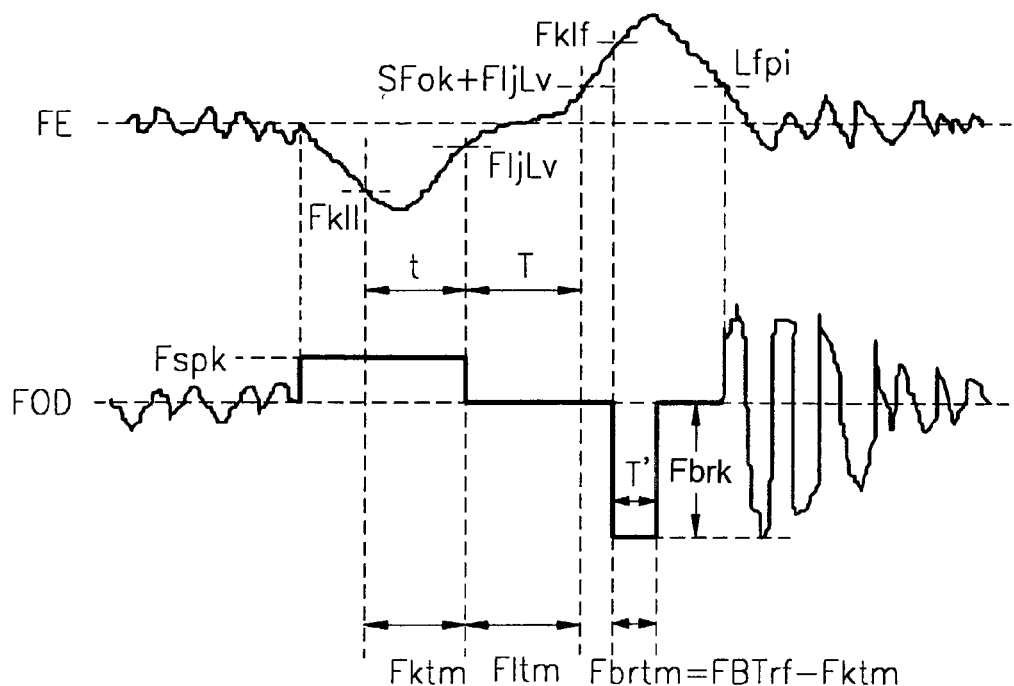
FIG. 6 is a waveform diagram of a focus error signal (FE) and a focus driving voltage (FOD) for explaining a layer change control method of an optical medium according to the present invention.

FIG. 4 shows a block diagram of a layer change control apparatus for an optical medium, for example, a disc 406, according to an embodiment of the present invention. As shown in FIG. 4, the layer change control apparatus comprises a control unit 401, a servo control unit 402, a motor driving unit 403, a pickup 404, an RF processing unit 405, and a storage unit 407. FIG. 6 shows a waveform diagram of a focus actuator error signal and a focus driving voltage to illustrate a layer change control method of the present invention. An operation of the layer change control apparatus will be described in detail below with reference to FIG. 6.

The control unit 401 provides a layer change command to the servo control unit 402 in response to a layer change command from a user or in response to a determination that a layer change is needed where an optical driver having the layer change control apparatus operates.

The servo control unit 402 measures a focus actuator error signal (hereinafter, referred to as "FE"), which is provided from the RF processing unit 405 each predetermined time unit where the optical driver operates, and obtains an average value of an output FOD (Favg). The obtained average value (Favg) is stored in the storage unit 407. The servo control unit 402 updates an average value (Favg) stored in the storage unit 407 with the obtained average value of the FOD (Favg).

Where the average value (Favg) is updated and the control unit 401 requests a layer change, so as to control a focus point set through the pickup 404 and have the focus point break away from a current layer of the disc 406, the servo control unit 402 reads the average value (Favg) stored in the storage unit 407. Then, the servo control unit 402 provides a value obtained by adding a kick voltage Fspk to the average value (Favg) as the FOD to the motor driving unit 403 and begins to measure a kick time Fktm corresponding to a kick interval t. The kick voltage Fspk is a kick force that makes the focus point, which is set through the pickup 404, break away from the current layer of the disc 406. The kick interval t is an interval in which the focus point breaks away from the current layer.

Accordingly, the motor driving unit 403 drives the focus actuator (not shown) installed in the pickup 404 by the provided FOD so as to have the focus point break away from the current layer of the disc 406. The pickup 404 outputs an RF signal according to light reflected from the disc 406. The output RF signal is sent to the RF processing unit 405. The disc 406 is, for example, an optical medium having a dual layer structure.

The RF processing unit 405 amplifies the RF signal from the pickup 404 to a predetermined level, and using the amplified RF signal, generates an FE signal. The generated FE signal is sent to the servo control unit 402.

The servo control unit 402 monitors a level of the FE signal from the RF processing unit 405 and detects a kick interval end point FljLv. Where the kick interval end point FljLv is detected, the measuring of the kick time Fktm stops. The servo control unit 402 stores the measured kick time Fktm in the storage unit 407.

Then, the servo control unit 402 again monitors a level of the FE signal and measures an inertia time Fltm corresponding to an inertia interval T. The measured inertia time Fltm is stored in the storage unit 407. At this time, the servo control unit 402 provides the FOD having the average value (Favg) of the FE level to the motor driving unit 403 at an inertia interval start point.

Then, the servo control unit 402 determines a brake time Fbrtm using a preset brake time coefficient FBTrf and kick time Fktm. That is, by subtracting the kick time Fktm from the brake time coefficient FBTrf, the brake time Fbrtm is detected. The brake time coefficient FBTrf is preset considering a mechanical deviation that may occur in a brake interval. The mechanical deviation may occur in the pickup 404 for each optical driver.

The detected brake time Fbrtm is stored in the storage unit 407. The servo control unit 402 selects information on a brake force corresponding the measured inertia time Fltm in the storage unit 407. The brake force information is a voltage needed to reduce a kick voltage, which is provided in order for the focus point of the pickup 404 to break away from the current layer, so that the focus point is pulled into a desired layer. Therefore, the brake interval T' may be expressed as a reduction interval.

The storage unit 407 is constructed so as to store a plurality of brake force information items, considering that the inertia time Fltm corresponding to the inertia interval may be measured differently due to the mechanical characteristic of the optical driver. Accordingly, the brake force information items corresponding to the inertia time Fltm that may occur, and obtained by experiments, may be pre-stored in the storage unit 407. The brake force information may be stored in a table structure in which the brake force information items corresponding to the inertia time Fltm can be read using the inertia time Fltm.

The servo control unit 402 sets the voltage, which is obtained by adding the brake force information obtained from the storage unit 407 and the average value (Favg) of the FE, as the FOD to be provided to the motor driving unit 403 in the brake interval T'. Where the brake time Fbrtm and FOD corresponding to the brake interval T' is determined, the servo control unit 402 provides the determined FOD to the motor driving unit 403 during the determined brake time Fbrtm. Accordingly, the pickup 404 performs an operation appropriate for the brake interval T', and the servo control unit 402 monitors the FE from the RF processing unit 405 and determines whether the focus point is pulled into the desired layer.

Here, where as the result of monitoring the FE level by the servo control unit 402, the focus point in the desired layer is sensed before the predetermined brake time, the brake operation stops and the focus is controlled to be pulled in the desired layer. Meanwhile, where the result of monitoring the FE level indicates that the focus is not pulled in to the desired layer, but the predetermined brake time is over, the servo control unit 402 provides the FOD having the average value (Favg) to the motor driving unit 403 from the brake interval end point to a point in which the focus is pulled into the desired layer, so as to control the operation of the pickup 404.

Figure 5A:
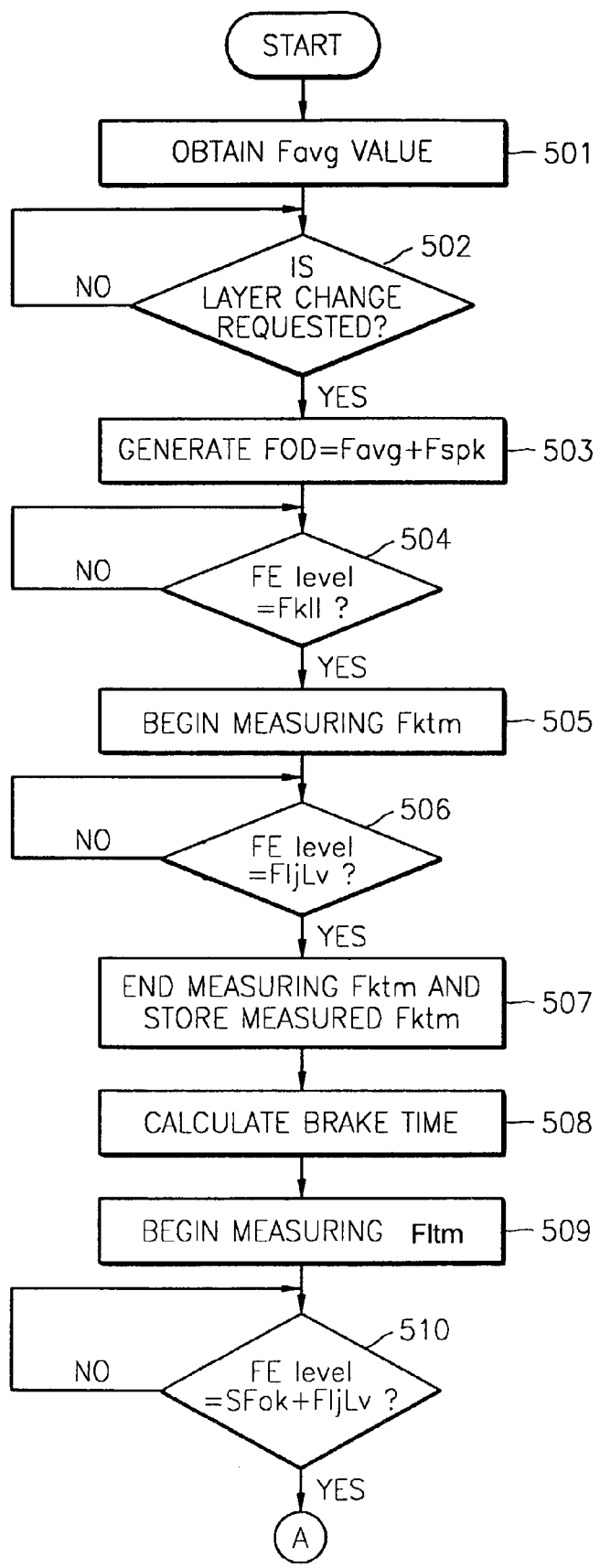
FIGS. 5A and 5B are flowcharts illustrating a layer change control method of an optical medium according to the present invention.
Figure 5B:
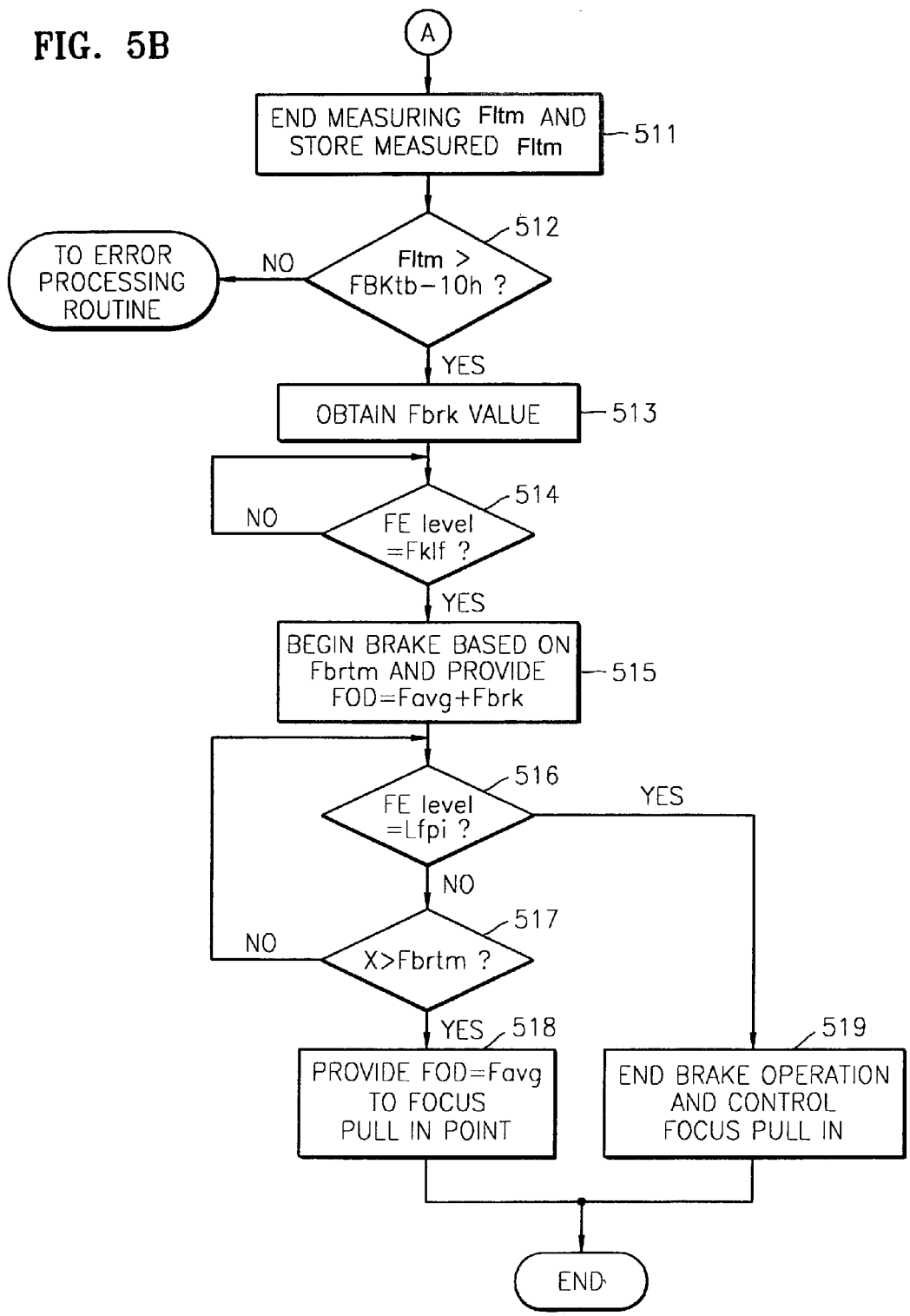

FIGS. 5A and 5B show flowcharts illustrating a layer change control method for an optical medium according to the present invention. The control method of FIGS. 5A and 5B will be described in detail with reference to FIGS. 4 and 6.

In operation 501, the servo control unit 402 drives the disc 406, which is currently used, while obtaining an average value (Favg) of an FOD which is output for a predetermined time. This average value (Favg) is stored in the storage unit 407. The stored average value (Favg) is updated in each predetermined time unit.

Where the control unit 401 requests a layer change of the disc 406 in operation 502, the servo control unit 402 provides a voltage obtained by adding the average value (Favg) to a kick voltage Fspk as a focus actuator driving signal (hereinafter, referred to as "FOD"), which is provided to the motor driving unit 403 in operation 503. The kick voltage Fspk is the same as explained referring to the servo control unit 402 of FIG. 4. Therefore, a kick interval may be expressed as a deviation interval for deviating from a current layer.

In operation 504, the servo control unit 402 monitors a level of an FE output from the RF processing unit 405, and determines whether the FE level arrives at a Fkll point shown in FIG. 6. Where it is determined in the operation 504 that the FE level arrives at the Fkll point, the servo control unit 402 begins to measure a time Fktm needed for the kick interval t, in operation 505. The Fkll is the FE level corresponding to a start of measuring a kick time Fktm.

In operation 506, the servo control unit 402 monitors the level of the FE output from the RF processing unit 405, and determines whether the FE level arrives at a FljLv point of FIG. 6. Here, |FljLv| should be smaller than |Fkll|. The FljLv is the FE level corresponding to an end of measuring the kick time Fktm. Where it is determined in operation 506 that the FE level arrives at the FljLv point, in operation 507, measuring of the time Fktm needed for the kick interval (or the kick time) stops, and the measured Fktm is stored in the storage unit 407. Thus, the needed time corresponding to the kick interval t is measured.

In operation 508, a brake time Fbrtm is calculated. That is, by subtracting the kick time Fktm from a brake time coefficient FBTrf, the brake time Fbrtm is obtained. As explained with reference to FIG. 4, the brake time coefficient FBTrf is a value which is preset considering a mechanical deviation that may occur in each optical driver. The brake time coefficient FBTrf may be preset by the user, considering the operational characteristic of the current pickup 404.

In operation 509, the servo control unit 402 begins to measure an inertia time Fltm for an inertia interval T. In operation 510, the servo control unit 402 monitors a level of the FE and determines whether the FE level arrives at a SFok+FljLv point shown in FIG. 6. The SFok is an FE hysteresis level.

Where it is determined in the operation 510 that the FE level arrives at the SFok+FljLv point, in operation 511, measuring of the inertia time Fltm for the inertia interval T stops, and the measured inertia time Fltm is stored in the storage unit 407.

In operation 512, it is determined whether the inertia time Fltm is greater than a value (FBKtb−10h(hexa)). The FBKtb is a minimum inertia time. The minimum inertia time is a fixed value. 10h is a value considering the scope of an error that can occur in the servo control unit 402. Where it is determined in the operation 512 that the inertia time Fltm is not greater than the value (FBKtb−10h(hexa)), an error processing routine is performed.

Where it is determined in the operation 512 that the inertia time Fltm is greater than the value (FBKtb−10h(hexa)), in operation 513, information on a brake force Fbrk corresponding to the inertia time Fltm is selected. A plurality of brake force Fbrk information items are stored in a form of, for example, tables in the storage unit 407. Therefore, the servo control unit 402 selects one brake force Fbrk information item corresponding to the inertia time Fltm among the plurality of brake force Fbrik information items stored in the storage unit 407.

In operation 514, the servo control unit 402 monitors the level of the FE and determines whether the FE level arrives at an Fklf point of FIG. 6. Where it is determined in the operation 514 that the FE level arrives at the Fklf point, a brake operation begins in operation 515. At this time, the brake operation is performed during the brake time Fbrtm corresponding to a brake interval T'. The brake time Fbrtm is determined in the operation 508. The storage unit 407 stores the brake time Fbrtm, and where the servo control unit 402 requests the brake time Fbrtm, provides it to the servo control unit 402. Then, a value obtained by adding the average value (Favg) obtained in the operation 501 and the brake voltage Fbrk is provided as the FOD provided to the motor driving unit 403.

In operation 516, the servo control unit 402 monitors the FE level and determines whether the FE level arrives at a focus pull in level, Lfpi point, shown in FIG. 6. Where it is determined in the operation 516 that the FE level does not arrive at the Lfpi point, a brake operation begins, and in operation 517, it is determined whether a processing time x till now is greater than the brake time Fbrtm. Where it is determined in the operation 517 that x is not greater than the brake time Fbrtm, the layer change control method returns to the operation 516.

However, where it is determined in the operation 517 that x is greater than the brake time Fbrtm, in operation 518, the motor driving unit 403 is controlled and the average value (Favg) is provided as the FOD to pull in the focus point to the desired layer.

On the other hand, where it is determined in the operation 516 that the FE level arrives at the Lfpi point, in operation 519, the brake operation stops and the motor driving unit 403 is controlled so as to pull the focus point into the desired layer. Here, the processing time x is not greater than the brake time Fbrtm. FIG. 6 shows a case where the processing time x is smaller than the brake time Fbrtm.

In the present invention described above, where a layer change of a dual-layer optical medium is performed, an FE level of a break-away time corresponding to an interval in which a focus point to the optical medium breaks away from a current layer, and an FE level of an inertia time corresponding to an inertia interval are monitored and measured. Then, using the measured break-away time and inertia time, the FOD and brake time in a brake interval are determined, and the focus point is controlled to be pulled into a desired layer. Thus, since a layer change can always be accurately performed even where there is a deviation in the FE level and the FE waveform, according to a physical characteristic of the optical medium and operational deviation of the focus actuator, a stable disc driving environment is provided.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A layer change method for an optical medium, the method comprising:
    measuring a needed time from where a focus point of the optical medium breaks away from a current layer to where the focus point arrives at a desired layer; and
    controlling a focus driving voltage needed to pull the focus point of the optical medium into the desired layer, and an output time to output the focus driving voltage by using the needed time;
    wherein the measuring of the needed time comprises:

measuring a first needed time of a kick interval in which the focus point breaks away from the current layer; and measuring a second needed time of an inertia interval from where the kick interval ends to where the focus point arrives at the desired layer, separately from the measuring of the first needed time, and wherein the controlling of the focus driving voltage and the output time to output the focus driving voltage comprises:

controlling the output time to output the focus driving voltage according to the first needed time of the kick interval and whether the focus point is pulled into the desired layer; and controlling the focus driving voltage according to the second needed time of the inertia interval and whether the focus point is pulled into the desired layer.

2. The method of claim 1, further comprising:

using an average value of a focus error (FE) signal of the optical medium, which is monitored in a predetermined time, and a focus driving voltage having a predetermined kick voltage during the kick interval; and using the focus driving voltage having the average value of the FE signal during the inertia interval.

3. The method of claim 1, wherein the controlling of the focus driving voltage and the output time to output the focus driving voltage further comprises:

determining a third time where the focus driving voltage is output according to the first needed time of the kick interval;

stopping a control operation where the focus driving voltage is output according to the first needed time of the kick interval and allowing the focus point to pull into the desired layer in response to the focus point being pulled into the desired layer before the third time is over;

wherein the focus driving voltage is used as a driving voltage until the focus point is pulled into the desired layer in response to the focus point not being pulled into the desired layer when the third time is over; and wherein the focus driving voltage used is absent voltage added due to the needed time of the inertia interval.

4. A layer change control method for an optical medium, the method comprising:

measuring a needed time for a break-away interval, in which a focus point of the optical medium breaks away from a current layer, as a first time in response to a layer change request;

measuring a needed time for an inertia interval, from where the break-away interval ends to a time immediately before the focus point is pulled into a desired layer, as a second time;

determining a focus driving voltage needed during a reduction interval, using the second time, to reduce a break-away force that is provided during the break-away interval to make the focus point pull into the desired layer;

determining a time needed in the reduction interval by using the first time and a predetermined time coefficient, as a third time; and controlling the reduction interval by using the focus driving voltage and the third time so as to pull the focus point into the desired layer.

5. The method of claim 4, wherein the controlling of the reduction interval comprises:

stopping a control operation of the reduction interval and pulling the focus point into the desired layer in response to the focus point being detected in the desired layer before the third time is over; and performing a control operation using the focus driving voltage, absent a voltage added due to the second time, to reduce the break-away force, as a focus driving voltage to pull the focus point into the desired layer in response to the focus point not being pulled into the desired layer even where the third time is over.

6. The method of claim 4, wherein the predetermined time coefficient is set according to a mechanical deviation which occurs in the reduction interval.

7. A layer change control method for an optical medium, the method comprising:

obtaining an average value of a focus driving voltage which is output for a predetermined time;

in response to a layer change request, providing a voltage obtained by adding the average value and a kick voltage, which is set to make a focus point of the optical medium break away from a current layer, as the focus driving voltage, and measuring a needed time for a kick interval in which the focus point breaks away from the current layer;

determining a needed time for a brake interval to reduce a force which is provided for the break-away of the focus point, by using the needed time for the kick interval and a predetermined time coefficient;

measuring a needed time for an inertia interval between the kick interval and the brake interval determining a brake force needed in the brake interval by using the needed time for the inertia interval;

determining a voltage obtained by using the brake force and the average value as the focus driving voltage to be used in the brake interval; and controlling the brake interval according to the determined needed time and the determined focus driving voltage thereof so as to pull the focus point into a desired layer.

8. The method of claim 7, wherein the average value is updated in each predetermined time unit.

9. The method of claim 7, wherein the measuring of the needed time for the kick interval, the measuring of the needed time for the inertia interval, and the controlling of the brake interval are performed based on a result of monitoring a focus error signal of the optical medium.

10. The method of claim 7, wherein the controlling of the brake interval comprises:

stopping a control operation of the brake interval and allowing the focus point to pull into the desired layer in response to the focus point being pulled into the desired layer before the needed time for the brake interval is over, and performing a control operation to pull the focus point into the desired layer using the focus driving voltage having the average value, in response to the focus point not being pulled into the desired layer even after the needed time for the brake interval is over.

11. A layer change control apparatus of an optical medium comprising:

a pickup which records data on or reproduces data from the optical medium;

a servo control unit which:

in response to a layer change request signal, monitors a focus error signal generated from the pickup, and measures a first needed time for a break-away interval, in which a focus point of the pickup breaks away from a current layer of the optical medium, and a second needed time for an inertia interval which is between a reduction interval to reduce a break-away force provided in the break-away interval, and the break-away interval, and determines a needed time for the reduction interval and a focus driving voltage which is generated in the reduction interval to control the layer change by using the first and second needed times; and a motor driving unit which is controlled by the servo control unit to drive the pickup.

12. The apparatus of claim 11, further comprising a storage unit which stores a plurality of reduction force information items corresponding to the break-away force, wherein the servo control unit selects one of the plurality of reduction force information items stored in the storage unit, by using the second needed time, and uses the selected one of the reduction force information items to determine the focus driving voltage generated in the reduction interval.

13. The apparatus of claim 12, wherein:
the storage unit further stores the first needed time and the second needed time, and
the servo control unit determines the needed time for the reduction interval by using the first needed time and a predetermined time coefficient for the reduction interval.

14. The apparatus of claim 11, further comprising:
a control unit which provides the layer change request in response to one of receiving a layer change signal and determining a layer change is needed; and
a processing unit which amplifies and provides the focus error signal generated from the pickup to the servo control unit.

15. The apparatus of claim 11, wherein the servo control unit:
monitors and updates an average value of a focus driving (FOD) signal of the pickup at each predetermined time unit,
provides the break-away force added to the average FOD signal as the FOD signal to drive the pickup in the break-away interval, so as to break-away from a current layer of the optical medium,
provides the average FOD signal as the FOD signal to drive the pickup in the inertial interval, and
provides a reduction force, to reduce the break-away force, added to the average FOD signal as the FOD signal to drive the pickup in the reduction interval.

16. The apparatus of claim 15, wherein the servo control unit determines the reduction force based on the second needed time for the inertia interval.

17. The apparatus of claim 15, wherein the servo control unit:
stops a control operation of the reduction interval and allows the pickup to focus to a desired layer of the optical medium in response to a focus point of the focus error signal being detected before elapse of the needed time for the reduction interval, and
provides the average FOD signal as the FOD signal to have the pickup focus to the desired layer in response to the pickup not being focused to the desired layer after elapse of the needed time for the reduction interval.

18. The method of claim 1, wherein the measuring of the first needed time for the kick interval, the measuring of the second needed time for the inertia interval, and the controlling of the output time and the focus driving voltage are performed based on a result of monitoring a focus error signal of the optical medium.

19. The method of claim 4, wherein the measuring of the needed time for the break-away interval, the measuring of the needed time for the inertia interval, and the controlling of the reduction interval are performed based on a result of monitoring a focus error signal of the optical medium.

20. The method of claim 7, further comprising performing an error processing routine of the optical recording medium in response to the needed time for the inertia interval not being greater than a predetermined value.

21. The method of claim 7, wherein the determining of the brake force comprises selecting a brake force corresponding to the needed time for the inertia interval among pre-stored brake force information items.

22. The method of claim 7, wherein the predetermined time coefficient is set according to a mechanical deviation which occurs in the brake interval.

* * * * *

UNITED STATES PATENT AND TRADEMARK OFFICE
CERTIFICATE OF CORRECTION

PATENT NO. : 7,283,436 B2  Page 1 of 1
APPLICATION NO. : 10/299812
DATED : October 16, 2007
INVENTOR(S) : Moon-soo Han et al.

It is certified that error appears in the above-identified patent and that said Letters Patent is hereby corrected as shown below:

Column 9, Line 31, claim 3 after "interval;" insert --and--.

Column 10, Line 30, claim 7 change "interval" to --interval;--.

Column 11, Line 43, claim 15 change "inertial" to --inertia--.

Signed and Sealed this

Twenty Second Day of April, 2008

JON W. DUDAS
*Director of the United States Patent and Trademark Office*